United States Patent [19]
Bengtsson et al.

[11] 3,848,877
[45] Nov. 19, 1974

[54] SEAL FOR PISTON ROD OF STIRLING ENGINE

[75] Inventors: John Ingemar Bengtsson, Eslov; Sven Anders Samuel Hakansson, Malmo; Sven Gunnar K:son Lundholm, Lund; Lars Lonnberg, Bara, all of Sweden

[73] Assignee: Kommanditbolaget United Stirling (Sweden) AB & Co., Malmo, Sweden

[22] Filed: Jan. 21, 1974

[21] Appl. No.: 435,186

Related U.S. Application Data
[62] Division of Ser. No. 329,710, Feb. 5, 1973.

[52] U.S. Cl. .................................... 277/3, 60/517
[51] Int. Cl. ...................... F16j 15/24, F16k 39/00
[58] Field of Search ............ 277/3, 15, 27, 24, 117, 277/124; 60/497, 516, 517; 92/165, 168

[56] References Cited
UNITED STATES PATENTS

| | | | |
|---|---|---|---|
| 419,805 | 1/1890 | Weiss | 60/517 |
| 1,960,927 | 5/1934 | Siegert | 92/168 |
| 2,204,374 | 6/1940 | Metzgar | 277/3 |
| 2,465,633 | 3/1949 | Cartier | 277/3 |
| 2,764,879 | 10/1956 | Lange | 60/516 |
| 3,200,581 | 8/1965 | Weiland | 60/497 |
| 3,667,349 | 6/1972 | Siebert | 60/517 |
| 3,688,512 | 9/1972 | Prast et al. | 60/517 |

*Primary Examiner*—Louis R. Prince
*Assistant Examiner*—Robert L. Smith
*Attorney, Agent, or Firm*—Laurence R. Brown, Esq.

[57] ABSTRACT

A Stirling cycle hot gas engine is provided with a seal about a moving piston rod for limiting leakage of gas from a high pressure working chamber into a low pressure crank casing. The seal is a conically shaped plastic ring urged against the piston rod by mating spring loaded metal wedge rings.

2 Claims, 1 Drawing Figure

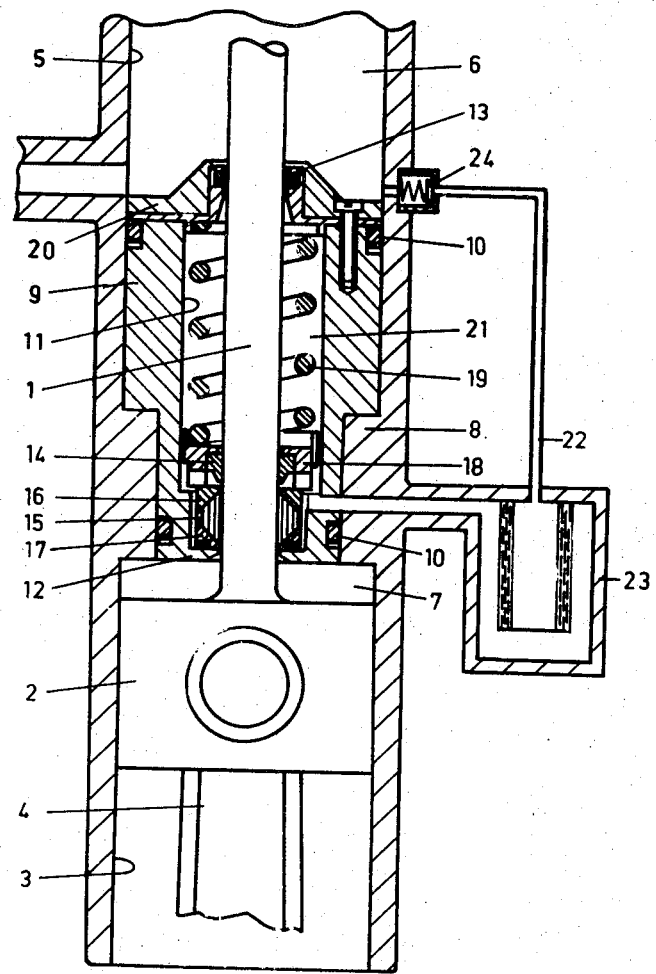

SEAL FOR PISTON ROD OF STIRLING ENGINE

This is a division, of application Ser. No. 329,710, filed Feb. 5, 1973.

The present invention relates to a sealing device of the kind (herein called "the kind defined") for limiting or preventing leakages of gas through an element through which extends a rectilinearly reciprocating rod from a chamber containing gas at a high cyclically-varying pressure to a gas-filled space in which the pressure is lower than the lowest pressure occurring in the said chamber, said element being between said chamber and said gas-filled space and accommodating sealing means through which the rod extends, the said sealing means allowing restricted passage of leakage gas from the said chamber beside the rod to a return conduit which returns the leakage gas to the said chamber and includes a non-return valve which allows gas to flow through the return conduit only in the direction towards the said chamber.

Sealing devices of the kind defined have been proposed for use in hot gas engines, e.g. engines of the type using the Stirling cycle. The problem may be to prevent working gas from leaking beside a piston rod to the crank casing and to prevent oil from the crank casing from entering into the working chambers of the engine.

In a known device of the kind defined it has been proposed to use a sealing fluid — together with gas leaking from said chamber — e.g. lubricating oil which is supplied to a space surrounding the piston rod and subsequently withdrawn through said return conduit.

However, this proposed device has the drawback that it requires a special device for supplying sealing fluid. Also this device will require special features to be able to seal against gas leakage when the engine is not running, and finally there is an inherent risk of oil passing into the gas employed in the working cycle.

The object of the present invention is to provide an improved sealing device of the kind defined, the improvements being a lower manufacturing cost and a more reliable operation even during extremely long intervals between services.

According to the present invention there is provided a sealing device of the kind defined characterized in that for separating said gas-filled space in which the pressure is lower than the said lowest cyclically-varying pressure from a space surrounding the rod and communicating with the return conduit including a non-return valve there is provided a resilient ring of synthetic plastics material conically tapered at both ends and surrounding the rod and wedged against the rod between two metal rings formed complementary to the tapered ends of the resilient ring, the wedging action being obtained by spring means loading the rings in the axial direction of the rod.

How the invention can be put into practice is described in more detail with reference to the accompanying drawing, which shows in vertical section a sealing device according to the invention used with a piston rod in a hot gas engine.

Referring to the drawing, a rectilinearly-reciprocating piston rod 1 is connected to a cross-head 2 guided in a cylindrical wall 3. The cross-head 2 is pivotally connected to a connecting rod 4 and the piston rod 1 is connected at its upper end to a piston (not shown) working in a cylinder 5. The sealing device described below is adapted to separate a first chamber 6 called a working chamber located above the sealing device and containing gas at high cyclically-varying pressure from a gas-filled space in the form of a second chamber 7 in which prevails a pressure lower than the lowest pressure occurring cyclically in the chamber 6. The said second chamber 7 is a part of a crank casing containing an oil-lubricated drive mechanism of which the cross-head 2 and the connecting rod 4 are elements.

An annular shoulder 8 extends radially inwardly relative to the adjacent ends of the cylindrical wall 3 and the cylinder 5. A sealing device comprises an annular housing 9 axially retained by said shoulder 8. O-rings 10 prevent flow of fluid in the axial direction between the housing 9 and the adjacent surfaces of the cylinder 5 and the shoulder 8.

The housing 9 is provided with a central bore 11 and an inwardly-extending flange 12. The piston rod 1 passes through the bore 11 and the flange 12 and is surrounded by a cap seal 13, an oil wiper 14 and a sealing element composed of a ring 15 of synthetic plastics material — e.g. of reinforced "Teflon" (Registered Trade Mark) — conically tapered at both ends and wedged between two complementary metal rings 16 and 17.

The oil wiper 14 is carried by a spider sleeve 18 resting on the ring 16 and serving as a support for the lower end of a compression spring 19, the upper end of which bears against a cover 20 secured to the housing 9 and retaining the cap seal 13.

The piston rod 1, the housing 9, the cover 20 and the ring 15 limit a space 21 surrounding the piston rod 1 and communicating with a return conduit 22 containing an oil separator 23 and a non-return valve 24.

The axial distance between the cap seal 13 and the oil wiper 14 — and thus the ring 15 — is greater than the length of the stroke of the piston rod 1.

The device as illustrated and described will operate as follows:

During operation of the engine in which the device is used the gas pressure in the chamber 6 will vary cyclically between a maximum and a minimum value. Due to the non-return valve 24 governing the flow through the conduit 22 the gas pressure in the space 21 will normally correspond to the minimum value of the pressure in the chamber 6. The cap seal 13 will restrict flow of gas — but cannot prevent such flow — from the chamber 6 into the space 21.

The pressure in the part 7 of the crank casing will normally be slightly above normal atmospheric pressure. The cross-head 2 is lubricated for obtaining low friction and for removing heat developed by friction. The lubricating oil will automatically contact — and thereby lubricate and cool — the lower end of the piston rod 1.

The ring 15 will prevent most of the oil from passing into the space 21, but a slight film of oil will in any case be drawn between the ring 15 and the rod 1. Any drops of oil and any oil vapors derived therefrom will be caught by the flow of gas passing continuously in the direction towards the filter 23 in which the oil will be condensed and separated from the gas flow and trapped.

Oil particles adhering to the rod 1 will not pass the cap seal 13 as the length of the stroke of the piston rod 1 is so small that the oil wiper 14 and the cap seal 13 will never contact the same parts of the piston rod 1.

Thus it can be seen that the illustrated device is of the kind defined, and that for separating the gas-filled space 7 in which the pressure is lower than the lowest cyclically-varying pressure in the cylinder chamber 6 from the space 21 surrounding the rod 1 there is provided the ring 15. The space 21 communicates with the return conduit 22 including the non-return valve 24. The ring 15 is wedged against the rod 1 between the two metal rings 16 and 17, the wedging action being obtained by the spring 19 acting through the sleeve 18 on the ring 16 and loading the rings 16 and 15 and 17 in the axial direction of the rod 1.

What is claimed is:

1. A Stirling cycle hot gas engine having a sealing device about a movable piston rod in a region extending between a first working gas filled chamber at high cyclic gas pressure and a second crankcase chamber with oil therein to lubricate said piston rod and having gas therein at lower pressure, said sealing device comprising in combination, a resilient synthetic plastic ring about said piston rod in said region conically tapered away from said rod on both ends, a pair of complementary metal ring wedges tapered toward said rod and mating with the ring on opposite sides thereof to urge said ring toward said rod thereby to engage it at a position lubricated by said oil, spring means loading the rings in the axial direction of the rod, and a gas flow return conduit including a one way valve connecting said region to said high pressure chamber to provide a flow path for gases toward said high pressure chamber and tending to maintain in said region a gas pressure at the lower cyclic pressure.

2. A device as defined in claim 1 including oil separating means in said return conduit.

* * * * *